April 3, 1934.  H. W. BULLOCK  1,953,551
VARIABLE SPEED TRANSMISSION GEARING
Filed March 16, 1933
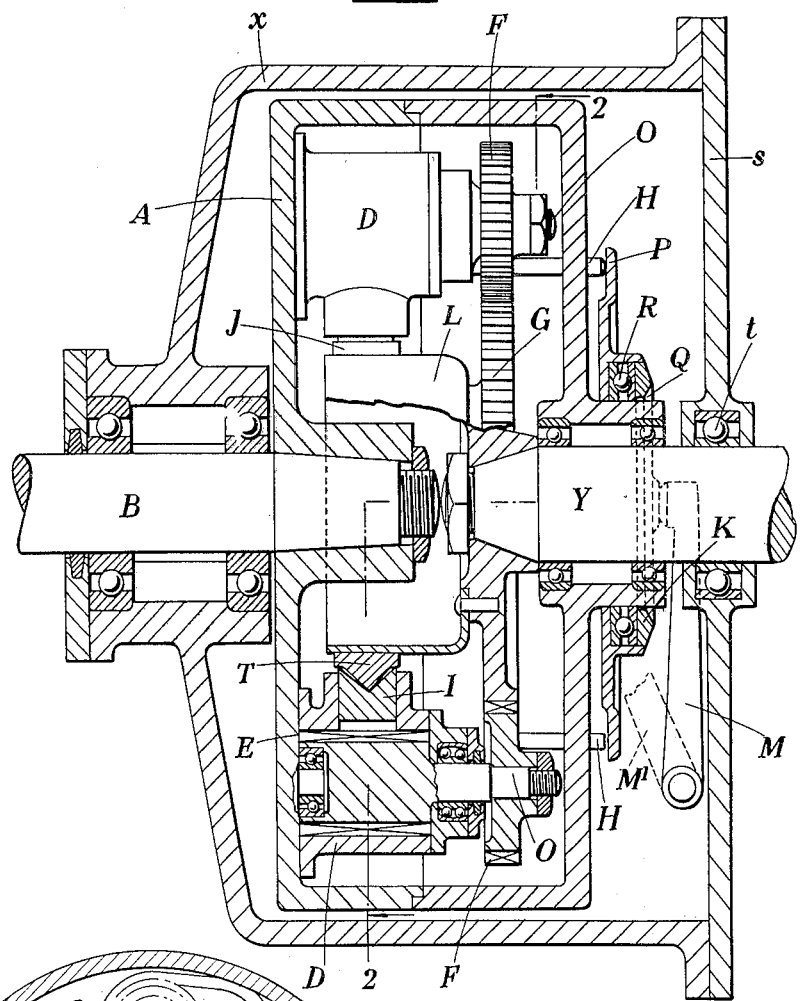
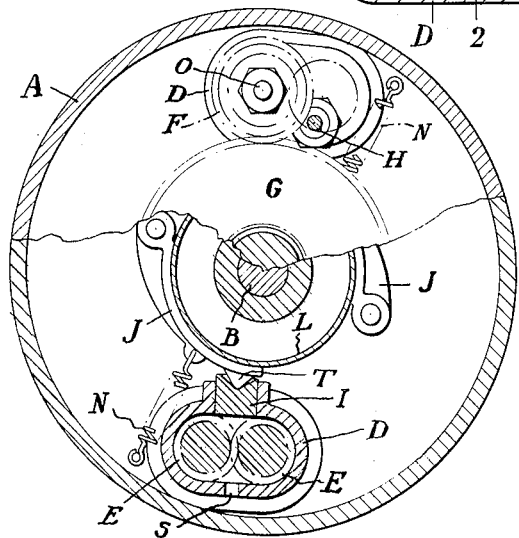
INVENTOR
H. W. Bullock
BY
ATTORNEY Patented Apr. 3, 1934

1,953,551

UNITED STATES PATENT OFFICE 1,953,551

VARIABLE SPEED TRANSMISSION GEARING

Howard William Bullock, Harrow, Middlesex, England, assignor to Bullock Auto-Gear Limited, Harrow, Middlesex, England Application March 16, 1933, Serial No. 661,125
In Great Britain March 10, 1932

4 Claims. (Cl. 74—34)

This invention relates to variable speed transmission gearing of the hydraulic clutch type and has for its primary object to provide an improved construction of apparatus employing sun and planet gearing, the planet wheels of which drive hydraulic pumps in which these pumps are arranged inside a hollow casing near to the outer circumference thereof.

A further object of the invention is to provide means whereby the sun and planet gears may be locked together when the pressure fluid inside the pumps exceeds a predetermined value.

With these and other objects in view the invention consists in the improved combinations and arrangements of parts contained within the preferred embodiment to be described in detail later and set out in the claims which follow.

The accompanying drawing illustrates one preferred form of gear constructed according to the invention.

In this drawing

Figure 1 represents a longitudinal cross-section through the gear,

Figure 2 represents a cross-section taken along the line 2, 2 of Figure 1.

This preferred form of gear will now be described in detail with reference to the drawing above mentioned.

The driving shaft B has connected thereto a closed hollow drum A which combines the functions of a fly wheel and clutch housing. Diametrically opposed on the outer part of the side of this drum near to the driving shaft are carried two pump casings D in which are mounted pump gear wheels E, and the spindle O of one of each pair of pump gear wheels projects beyond the pump casing and carries a planet pinion F. The planet pinions engage a sun pinion G which is mounted upon a portion of the driven shaft Y which projects into the drum at the side opposite to the driving shaft B.

As the driving shaft B is rotated it carries with it the pumps D and any rotation of the planet wheels F upon their own shafts due to difference in speed between the driving and the driven shafts sets up pressure in the pump system, thus providing the necessary resistance to enable transmission of variable gear ratio to take place.

If the pumps are short-circuited so that they offer no resistance to rotation, the driving shaft can rotate without any transmission to the driven shaft so that the whole apparatus functions as an open clutch, and by varying the pressure in the pumps a condition equivalent to a slipping clutch can be obtained.

In order to provide this action in the improved form of gear, I mount control valves in the pumps so that their spindles H project and engage a ring P carried on boss Q on the driven shaft side of the drum. This ring is movable in a direction parallel to the axes of the shafts by an axially movable member K carried on the boss projection of the drum and connected with the ring by a ball bearing R. This axially movable member is under the control of pedal levers M, $M^1$ or other suitable external operating member, so that the effective resistance in the pump circuits can be adjusted to give resistances from zero up to a maximum.

The valves carried by the spindles H control the outlet of oil from the pressure side of the pump into the casing. The inlet to the pumps is by ports S close to the circumference of the drum so that centrifugal pressures assist inlet and keep the pumps full of oil.

The means whereby when the pumps have developed the requisite pressure to provide a solid or top gear drive, there may be a direct frictional driving connection between the two shafts, comprises an arcuate shoe J operated by a plunger I carried by each pump casing; this arcuate shoe is pivoted to the drum and is normally held by a spring N out of contact with an inner drum L carried by the driven shaft and preferably secured to the sun wheel G.

The end T of each shoe is in contact with the plunger I having a fluid-tight connection with the pump casing so that the plunger can move outward and overcome the spring N to drive the shoe against the inner drum to give a direct friction drive.

The driven shaft Y is supported by a bearing T carried by a plate S forming part of the casing.

I claim:—

1. A variable speed transmission gear comprising in combination a driving and a driven member, a hollow casing mounted on one of said members, planet wheels connected to said casing, a sun wheel carried by the other of said members, pumps driven by the rotation of said planet wheels, a drum connected to the other of said members, arcuate levers on the outer periphery of said drum, springs normally holding said arcuate levers out of contact with said drum and plungers operated by said pumps to bring said arcuate levers into engagement with said drum when the pressure within said pumps exceeds a predetermined limit.

2. A variable speed transmission gear comprising in combination a driving and a driven member, a hollow casing mounted in one of said members, planet wheels carried by the casing, a sun wheel carried by the other of said members and cooperating with the planet wheels, pumps driven by the rotation of the planet wheels, means operated by the pump pressure for securing the driving and driven members against relative rotation, said means including an element carried by one of said members, and frictional engaging members for the element operated by pump pressure.

3. A variable speed transmission gear comprising in combination a driving and a driven member, a hollow casing mounted in one of said members, planet wheels carried by the casing, a sun wheel carried by the other of said members and cooperating with the planet wheels, pumps driven by the rotation of the planet wheels, means operated by the pump pressure for securing the driving and driven members against relative rotation, said means including a drum carried by the driven member, and brake shoes cooperating with the drum and operated by pump pressure.

4. A variable speed transmission gear comprising a driving member, a driven member, a hollow drum mounted on and secured to the driving member and rotatively supported on and movable with respect to the driven member, said drum serving as a fly wheel, dynamically balanced rotor pumps carried by one end wall of the drum adjacent the periphery of the drum, said pumps having the axes of the rotors parallel to the axis of rotation of said hollow drum, and being formed with inlets in the wall next the peripheral wall of the drum, planet pinions in driving relationship with said pumps, a sun wheel engaging said planet pinions and secured to said driven member, valves for controlling the discharge from the pumps, stems operating said valves projecting through the hollow drum, an axially movable ring engaging said stems, and means externally operable for causing axial movement of said ring.

HOWARD WILLIAM BULLOCK.